May 5, 1970 E. E. SHARPE 3,510,037

DEVICE FOR FEEDING PRESSURE SENSITIVE TAPE WITHOUT COIL

Filed Oct. 24, 1967 2 Sheets-Sheet 1

INVENTOR.
EVERETT E. SHARPE

BY

McGlew & Toren
ATTORNEYS

INVENTOR.
EVERETT E. SHARPE

BY

McGlew & Toren
ATTORNEYS 3,510,037

DEVICE FOR FEEDING PRESSURE SENSITIVE TAPE WITHOUT COIL

Everett E. Sharpe, Shelton, Conn., assignor to Better Packages, Inc., Shelton, Conn.
Filed Oct. 24, 1967, Ser. No. 677,608
Int. Cl. B65h 17/06
U.S. Cl. 226—5 14 Claims

ABSTRACT OF THE DISCLOSURE

A device for feeding pressure sensitive tape from a roll thereof includes a grooved drum or roller made of a material which will easily release from a tacky material such as pressure sensitive adhesive. Means are provided to guide the tape over the surface of the drum in a manner such that the tape is centered over the groove of the drum which extends completely around the drum surface. The tape is wide enough such that a portion of the tape overlaps the drum surface on each side of the groove. An inventive feature resides in the provision of tape deflection means such as a bar which is mounted above the drum and may be adjustably positioned so as to force the tape into the groove and simultaneously displace the sides of the tape inwardly from each side toward the center of the groove to release it from the drum surface. The drum is rotated to advance the tape and a crease line is formed centrally of the tape by the bar which presses the center of the tape downwardly into the groove. The action frees the tape from the drum, overcomes the tendency of the tape to coil and permits the feed-out of the tape in a creased form which sufficiently rigidizes the tape so that it will feed outwardly in a substantially straight line and will project away from the feeding device into a position in which it will be easily grasped by the user.

SUMMARY OF THE INVENTION

This invention relates in general to tape dispensing devices and to a method of dispensing pressure sensitive tape and in particular to a new and useful tape dispenser which includes means for guiding the tape over a non-sticky surface of a roller having an annular groove defined therearound with means associated with the roller for directing the tape downwardly into the groove so that it is disengaged from the roller surface and creased along its longitudinal axis as it is dispensed outwardly.

With known devices it is very difficult to dispense pressure sensitive or tacky surface tape automatically because of the difficulty which is encountered in causing the tape to release from the feeding roller or associated mechanism. In addition it has been found that when a pressure tape is dispensed outwardly from a roll supply thereof, there is a tendency for the tape to assume a reverse coil so that it bends back upon itself and becomes stuck together and non-usable.

In accordance with the present invention it has been found that a pressure-sensitive tape can be fed outwardly from a roller without imparting a reverse coil to the tape by providing means for effecting the formation of a groove or crease line along the longitudinal center line of the tape and the displacement of the tape ot cause the release of the tape from the feeding roller. For this purpose, the feeding roller is provided with a groove which is defined completely around its periphery. The deflecting means comprises a bar or roller member which is adjustably positioned above the roller and may be located so that its edge bears downwardly on the tape centrally between the sides thereof to force the tape to progressively move downwardly into the groove of the roller. This downward movement causes the inward movement of the sides of the tape which rest on the outer periphery of the roller toward the center of the groove and causes the release of the tape from the roller surface.

For the purposes of the invention it is found necessary to use a roller made of a material which has good release characteristics in respect to adhesives or tacky materials and for this purpose it has been found practical to use a silicon composition roller or a roller having a surface treated with a silicon material. The deflecting means for the tape is advantageously mounted in a position such that it may be oriented directly over the center of the tape in a position to cause the tape to move downwardly into the groove of the roller to achieve the desired operational characteristics. When a tape is fed in this manner, it will project outwardly substantially tangentially to the top of the drum but the deflecting means may be oriented to feed it upwardly or downwardly at an angle. The crease imparted permits it to be fed a considerable distance outwardly before it will loose its rigidity so that an operator may easily grasp the tape and position it on a package. A further advantage of the construction is that a package may be positioned directly at the discharge of the dispenser and the tape may be fed directly at the discharge of the dispenser and the tape may be fed directly over the package and then pressed downwardly thereon during the dispensing operation. This procedure permits the tape to be rubbed down along the container over which it is fed and then torn off as the container is removed.

Accordingly it is an object of the invention to provide an improved device for feeding pressure sensitive tape which includes means for forming a central crease line along the tape and for displacing the tape in respect to the surface of a feeding roller to cause its release therefrom.

A further object of the invention is to provide a grooved roller device for feeding pressure sensitive tape with means for guiding the tape over the surface of the roller and with adjustable means for deflecting the tape downwardly into the groove of a roller as it is being fed by the rotation of the roller whereby the tape is formed into a substantially rigid bent shape as it is being dispensed.

A further object of the invention is to provide a tape dispensing device which is simple in design, rugged in construction and economical to manufacture.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there is illustrated and described preferred embodiments of the invention.

DETAILED DESCRIPTION

Figures 1, 2:
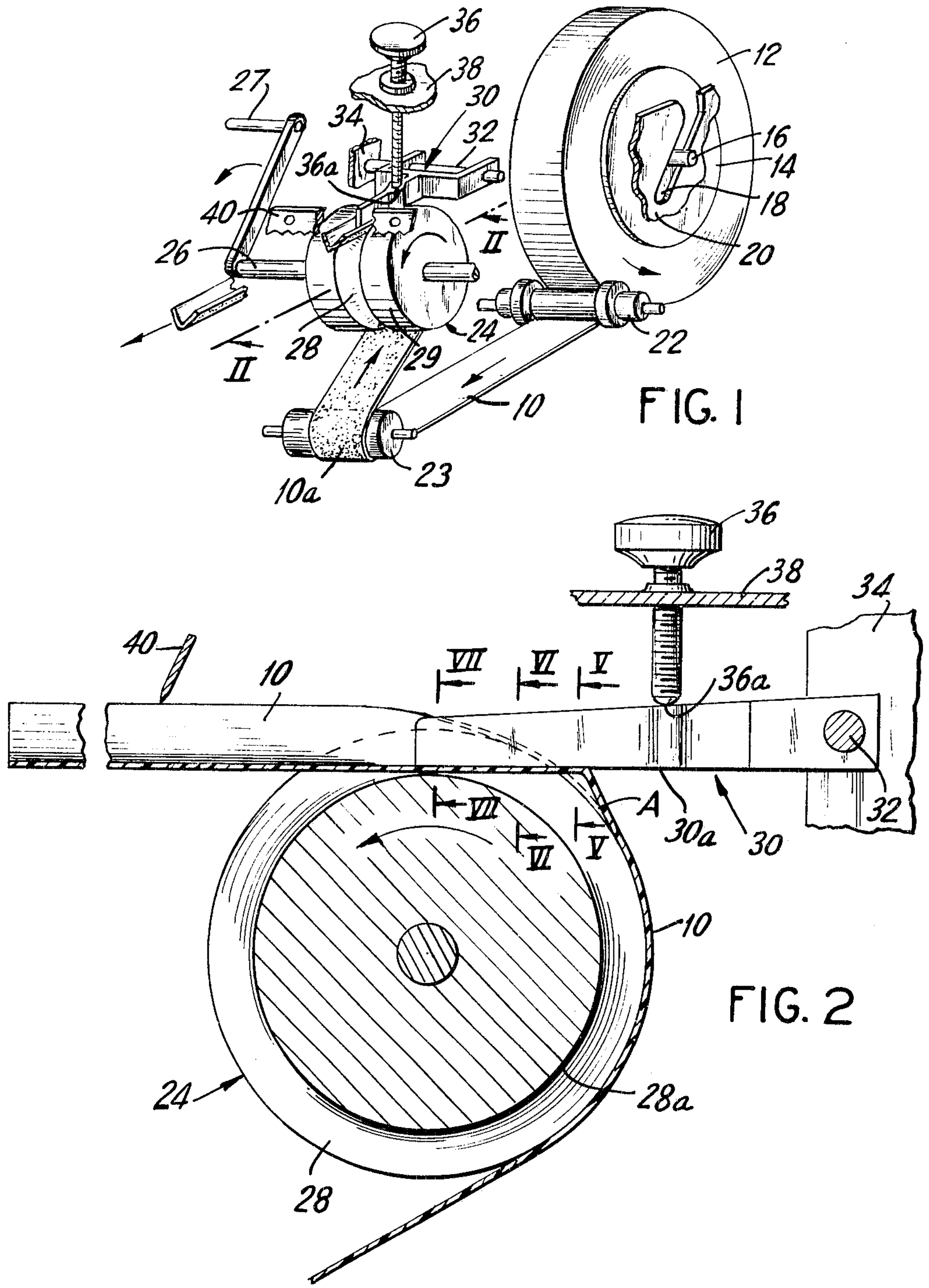
FIG. 1 is a somewhat schematic perspective view of a tape dispensing device for pressure-sensitive tape constructed in accordance with the invention.
FIG. 2 is an enlarged sectional view taken along the lines II—II of FIG. 1.

Referring to the drawings in particular, the invention embodied therein comprises a device for feeding or dispensing a sealing tape 10 having a side with a pressure sensitive adhesive 10*a* thereon from a reel or roll supply 12. The roll supply 12 is mounted on a reel 14 having axles 16 which are journalled in obliquely formed guides or slots 18 of a fixed member or bracket 20. Means such as the bracket or side frame 20 also rotatably support a guide roller or pull-off roller 22 which is mounted in fixed position on frame 20. The axles 16 may move downwardly in the slots 18 so that the periphery of the tape roll 12 will always bear against the roller 22 at which the tape 10 feeds away from the roll supply 12. Collars 22*a* and 22*b* on the roller 22 may be adjusted laterally and locked in a position at which they bear against the respective sides of the tape roll supply 12. A second guide roller 23 is rotatably mounted by suitable means (not shown) in a position to guide the tape 10 around a substantial portion of a feed roller or grooved roller generally designated 24.

In accordance with the invention, the feed roller 24 is rotatably mounted on axle 26 on suitable fixed supports (not shown) and is driven by means such as a hand crank 27 or other suitable means such as a motor (not shown). The roller 24 has a surface 29 of a material such as silicone which releases easily from adhesive or similar tacky substances such as the pressure sensitive adhesive 10*a* of the tape 10 and it is provided with a groove 28 of substantially V-shaped, U-shaped, or rectangular configuration which extends completely around the surface thereof. The tape 10 is fed upwardly through an arc over a portion of the surface of the roller 24.

Figures 5, 6:
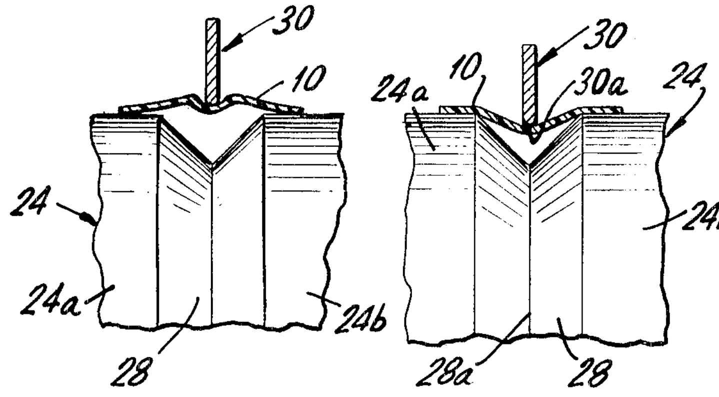
FIG. 5 is a section taken along the line V—V of FIG. 2.
FIG. 6 is a section taken along the line VI—VI of FIG. 2.
Figure 7:
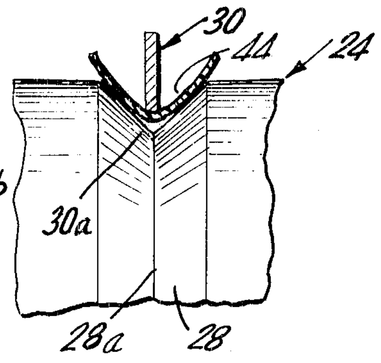
FIG. 7 is a section taken along the line VII—VII of FIG. 2.

In accordance with a further provision of the invention, deflecting means comprising a creasing bar or deflecting bar generally designated 30 is pivotally mounted at its inner end on a pivot 32 carried by a fixed member 34. Its bottom is formed with a blunt or snub-nosed edge 30*a* which bears against the surface of the tape at a location aligned with the center line or bottom 28*a* of the groove 28. As the tape 10 moves around on the roller 24 during the rotation thereof, the bar 30 deflects the central portion of the tape inwardly into the groove 28 by an amount set by the position of the bar 30. The deflection of the tape 10 into the groove 28 causes it to bulge or lift off the roller 24 at the location A. The ends of the tape will move inwardly on the surface of the roller to cause it to gradually release from the surface of the roller 24 as indicated in FIGS. 5, 6 and 7. In FIG. 7, the adhesive 10*a* of the tape 10 is substantially completely disengaged from the roller 24.

The bar 30 is mounted so that it may be adjusted in respect to the amount at which it projects downwardly into the groove 28, and for this purpose there is provided an adjustable set screw 36 which is rotatably mounted on a fixed plate 38 directly above the bar 30 in a position to permit the lower end 36*a* of the set screw to bear against the bar 30 to control the operating position thereof. In addition, the pivot 32 is advantageously supported so that its position may be adjusted in order to vary the direction in which the tape 10 is fed away from the roller 24. For example, when the support for the pivot 32 is moved upwardly, the tape 10 will be fed obliquely downwardly.

Figure 3:
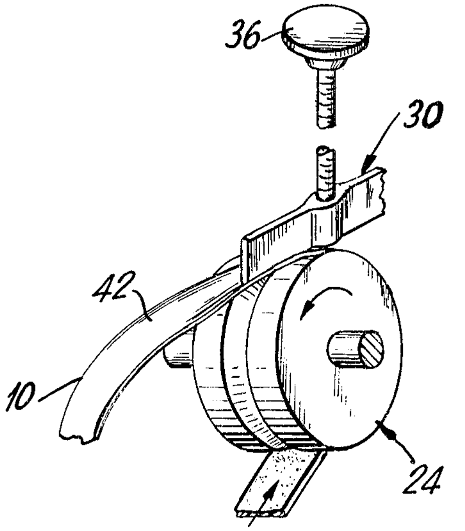
FIG. 3 is a partial perspective view of a portion of the device indicated in FIG. 1 indicating operation with the operating blade at a partial tape creasing position.
Figure 4:
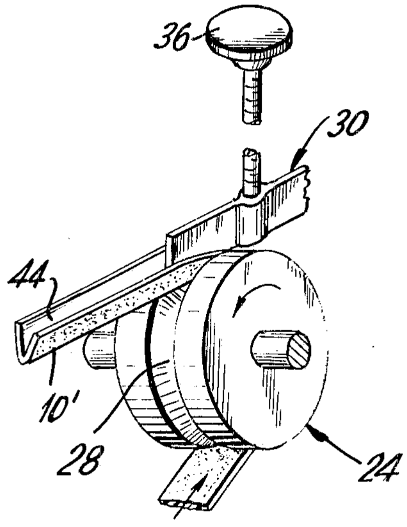
FIG. 4 is a view similar to FIG. 3 indicating the operating blade in a substantially full creasing position.

Rotation of the roller 24 causes the tape to move beyond the position indicated in FIG. 7 at which substantially a full V-shaped groove is formed in the tape, and further to a projecting position as indicated in either FIG. 3 or 4. When the bar 30 is set to the full depth as indicated in FIG. 7, the tape 10 will project in a substantailly V-shaped configuration as indicated in FIG. 4. It will be sufficiently rigidized by the V-shaped formation so that it will feed outwardly to a considerable extent before the end collapses downwardly. It will be self-sustaining so that an operator may easily grasp the end of the tape away from the dispenser and apply it to a container or other device. To sever the tape, it is lifted so that it moves through a path intersecting a fixed cutting knife 40 to effect severing of the tape.

It should be appreciated that the bar 30 will normally deflect the central portion of the tape into the groove 28 without causing it to become adhered to the surfaces of the roller defining the groove. However, when the bar 30 is positioned by the set screw 36 so that it extends downwardly by an amount sufficient to cause the tape to be fully deflected against the walls of the groove, the tape will nevertheless release from the roller because of the easy release characteristics of the roller surface and also because the structural shape which is imparted to the tape creates a stiffness sufficient to release whatever slight adhesion has taken place without affecting the projection of the tape into a pick-up position.

The bar 30 may be adjusted so that, for example, it will be set as indicated in FIG. 3 so that the tape will form only a slight groove or indentation 42 or may be set as indicated in FIG. 7 to form the V-shaped or sharp groove 44 for the tape 10′. In the case of the formation of the groove 42, the bar 30 will be located so that the formation will be sufficient to counteract any tendency of the tape 10 to form a reverse coil. When the bar 30 is set as indicated in FIG. 4, the tape will be such that it will feed outwardly away from the roller 24 in a rigid formation for a distance sufficient to permit it to be easily lifted off the device after a substantial length of tape has been fed.

Figure 8:
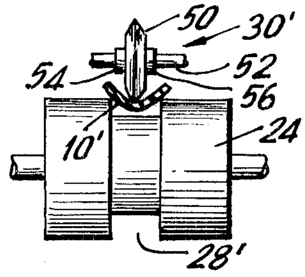
FIG. 8 is a partial front elevational view on a reduced scale of another embodiment of grooved drum with a deflecting roller.

In the embodiment indicated in FIG. 8, a grooved drum 24′ includes a central cut-away portion 28′ which forms an annular recess extending into the central portion of the groove of the drum surface. In this embodiment, the deflection means 30′ comprises a rotatable roller 50 which is centered on its shaft 52 by means of collars 54 and 56 at a location at which it will engage the tape 10′ centrally between the edges thereof and deflect it into the groove 28′. The arrangement will operate in a manner similar to that of the device indicated in FIG. 1 to cause a creasing of the tape 10′ and the releasing of the tape from the surface of the roller 4′. The shaft 52 is advantageously carried on means (not shown) which permits the adjustment of the position of the roller 50 in order to permit variations of the depth of penetration of the tape 10′ into the groove 28′.

Figure 9:
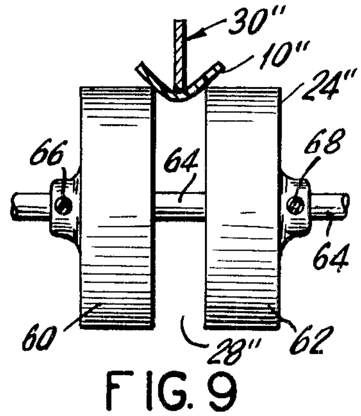
FIGS. 9 and 10 are partial front elevational views of other embodiments of the invention.

In the embodiment illustrated in FIG. 9, a grooved drum generally designated 24″ is made up of two roller elements 60 and 62 which may be adjustably positioned along a supporting shaft 64 and locked in an adjusted position by set screws 66 and 68, respectively. As indicated in FIG. 9, the roller elements 60 and 62 are spaced apart to define a recess or separation 28″ into which the tape 10″ is deflected by deflecting bar means 30″. In this arrangement it is possible to adjust the lateral width of the groove 28″ in order to accommodate various types and widths of tape.

Figure 10:
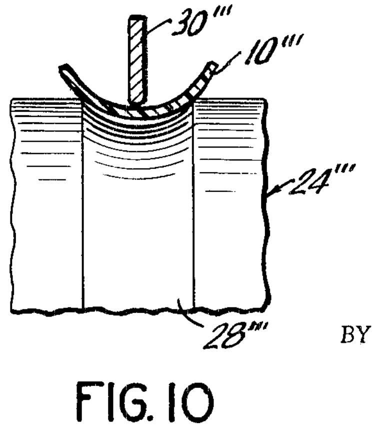

In the embodiment illustrated in FIG. 10, a roller 24‴ includes a groove 28‴ which is of curved or substantially U-shaped configuration so that the tape 10‴ is forced into a U-shaped configuration by the deflecting bar 30‴.

While specific embodiments of the invention have been shown and described in detail to illustrate the application of the inventive principles, it will be understood that the invention may be embodied otherwise without departing from such principles.

What is claimed is:

1. A device for dispensing pressure-sensitive tape having one side with a tacky adherent surface from a roll of such tape, comprising a rotatable roller having a peripheral surface of a material which is easily disengageable from a tacky surface of said tape, said roller having a groove defined in said surface, means for rotatably mounting a roll of pressure-sensitive tape adjacent said roller, guide means between said roller and said mounting means for guiding pressure-sensitive tape from the roll of the tape and over at least a portion of said roller surface and for aligning the tape so that at least a portion of said tape on its tacky side engages said roller surface and a portion of the tape on the same tacky side overlies the groove of said roller, means for rotating said roller with the tape adhesively engaged therewith to draw the tape off the roll and for advancing the tape in contact with said roller through an arcuate path on said roller and tape deflecting means overlying said roller at a location spaced from the location of initial engagement of the tape with said roller and contacting and deflecting the tape which is adhesively engaged with the surface of said roller for movement during rotation of said roller into the roller groove and to effect displacement of the tape to free it from the surface of said roller and to cause it to feed off the roller.

2. A device according to claim 1, wherein said deflecting means is located directly over the groove of said roller and it is positioned to extend into said groove to the extent to crease the tape by bending it inwardly along a longitudinally extending crease line as it is deflected into the groove.

3. A device according to claim 1, wherein said roller comprises a cylinder having a groove defined around the surface thereof, said guide means acting to feed tape over the surface of said roller at a location at which the tape spans the groove and contacts the surface of the roller on each side of the groove.

4. A device according to claim 1, wherein said deflecting means includes a deflecting arm pivotally mounted at one end and having an opposite end oriented over and resting upon the surface of the tape which is opposite to the tacky surface and disposed to urge the center of the tape into the groove as it is fed.

5. A device according to claim 4, including means engageable with said arm for adjusting the position of said arm in respect to the tape.

6. A device according to claim 4, including an adjustable member on the side of said arm opposite to the side of the arm engaged with the tape and engageable with said arm to vary the amount by which the arm presses against said tape and presses said tape into the groove.

7. A device according to claim 6, wherein said arm overlies said roller groove at the top of the roller and terminates at a location substantially tangent to the top surface of the groove of said roller, whereby the tape which is deflected into the groove is moved substantially tangentially outwardly from the roller.

8. A method of dispensing a pressure-sensitive tape having one side with a tacky adherent surface from a roll of the tape using a feed roller having a groove defined therearound comprising directing the pressure-sensitive tape onto the surface of the roller with the tacky side touching the roller and bridging the groove defined on the roller, drawing the tape off the roll by rotating the feed roller with the tacking side of the tape engaged with the surface of the roll, and thereafter deflecting the tape into the groove by an amount to form at least a slight crease in the tape and to cause the sides of the tape to move inwardly to become freed from the roller and to feed outwardly as the roller is rotated.

9. A method according to claim 8, wherein the tape is deflected into the groove by an amount sufficient to cause the tape to form a substantially V-shaped configuration whereby the tape becomes sufficiently rigid to project outwardly from the roller so that it will be in a position so that it may be easily engaged by an operator.

10. A device for feeding a tape having at least one side with a pressure-sensitive adhesive thereon, comprising a member having a surface of a material which is releasable from adhesive and having a groove defined in the surface thereof, means for moving said member with said surface, means for guiding a tape with the adhesive surface to engage with its adhesive surface over the surface of said member at a location bridging the groove and to move with said surface to draw along the tape in adhesive engagement therewith, and means for deflecting the tape into the groove to displace and release the sides of the tape from the surface of said member.

11. A device according to claim 10, wherein said member comprises a roller having a substantially rectangularly shaped groove defined therearound.

12. A device according to claim 10, wherein said member comprises a roller formed of two separate roller elements, a shaft for mounting said roller elements, said roller elements being positioned on said shaft at spaced locations from each other to define a groove therebetween.

13. A device according to claim 10, wherein said member comprises a roller having a substantially V-shaped groove.

14. A device according to claim 10, wherein said member comprises a roller having a substantially U-shaped groove.

References Cited

UNITED STATES PATENTS

| | | | |
|---|---|---|---|
| 2,538,520 | 1/1951 | Holt | 226—88 X |
| 2,684,240 | 7/1954 | Lindsey | 226—88 |
| 2,793,856 | 5/1957 | Nixon | 226—88 |
| 3,224,705 | 12/1965 | Nash | 226—88 X |
| 3,353,432 | 11/1967 | Philippi | 226—88 X |

RICHARD A. SCHACHER, Primary Examiner

U.S. Cl. X.R.

83—176; 226—88